United States Patent
Nishikawa

(10) Patent No.: US 11,013,998 B2
(45) Date of Patent: May 25, 2021

(54) METHOD, NON-TRANSITORY COMPUTER-READABLE RECORDING MEDIUM, INFORMATION PROCESSING SYSTEM, AND INFORMATION PROCESSING DEVICE

(71) Applicant: GREE, Inc., Minato-ku (JP)

(72) Inventor: Tomoaki Nishikawa, Minato-ku (JP)

(73) Assignee: GREE, Inc., Minato-ku (JP)

( * ) Notice: Subject to any disclaimer, the term of this patent is extended or adjusted under 35 U.S.C. 154(b) by 150 days.

(21) Appl. No.: 15/003,429

(22) Filed: Jan. 21, 2016

(65) Prior Publication Data

US 2016/0214012 A1    Jul. 28, 2016

(30) Foreign Application Priority Data

Jan. 28, 2015 (JP) .............................. JP2015-014023

(51) Int. Cl.
*A63F 13/497* (2014.01)
*A63F 13/355* (2014.01)
*A63F 13/79* (2014.01)
*A63F 13/95* (2014.01)

(52) U.S. Cl.
CPC .......... *A63F 13/497* (2014.09); *A63F 13/355* (2014.09); *A63F 13/79* (2014.09); *A63F 13/95* (2014.09); *A63F 2300/402* (2013.01)

(58) Field of Classification Search
CPC ........... H04N 5/93; G09B 5/02; A63F 13/497; A63F 13/355; A63F 13/79; A63F 13/95; A63F 2300/402

See application file for complete search history.

(56) References Cited

U.S. PATENT DOCUMENTS

| | | | | |
|---|---|---|---|---|
| 8,232,962 | B2* | 7/2012 | Buck ..................... | G06F 3/013 345/156 |
| 8,498,722 | B2* | 7/2013 | Chung ............... | H04N 21/4781 700/91 |
| 9,199,165 | B2* | 12/2015 | Zahn ..................... | H04N 5/917 |
| 2008/0268961 | A1* | 10/2008 | Brook ................ | H04N 21/4781 463/42 |
| 2008/0320126 | A1* | 12/2008 | Drucker ................ | G06Q 30/00 709/224 |

(Continued)

FOREIGN PATENT DOCUMENTS

| JP | 2002-278691 A | 9/2002 |
|---|---|---|
| JP | 2009-247563 A | 10/2009 |

(Continued)

OTHER PUBLICATIONS

Japanese Office Action dated Mar. 21, 2017 in Patent Application No. 2016-159551 (with English translation).

(Continued)

*Primary Examiner* — Malina D. Blaise
(74) *Attorney, Agent, or Firm* — Oblon, McClelland, Maier & Neustadt, L.L.P.

(57) ABSTRACT

A system that acquires, from a terminal device, log data related to progress of the game generated by the terminal device; creates the video based on the log data; generates metadata related to progress of the game based on the log data; associates the metadata with the video; and outputs the video and associated metadata.

21 Claims, 6 Drawing Sheets

(56) References Cited

U.S. PATENT DOCUMENTS

| | | | | |
|---|---|---|---|---|
| 2009/0131177 | A1* | 5/2009 | Pearce | A63F 13/12 463/43 |
| 2010/0026801 | A1* | 2/2010 | Williams | G11B 27/28 348/135 |
| 2011/0183732 | A1* | 7/2011 | Block | G07F 17/32 463/1 |
| 2012/0028706 | A1* | 2/2012 | Raitt | A63F 13/52 463/31 |
| 2012/0109813 | A1* | 5/2012 | Buck | G09G 5/00 705/37 |
| 2012/0134651 | A1* | 5/2012 | Cottrell | A63F 13/00 386/278 |
| 2013/0260896 | A1* | 10/2013 | Miura | A63F 13/86 463/42 |
| 2014/0179439 | A1* | 6/2014 | Miura | A63F 13/73 463/42 |
| 2014/0274297 | A1* | 9/2014 | Lewis | A63F 13/335 463/20 |
| 2014/0364206 | A1 | 12/2014 | Shiraiwa et al. | |
| 2014/0370979 | A1* | 12/2014 | Zahn | A63F 13/00 463/31 |
| 2015/0163199 | A1* | 6/2015 | Kailash | H04L 63/1425 726/11 |
| 2015/0217196 | A1* | 8/2015 | McCarthy | A63F 13/795 463/24 |
| 2015/0224395 | A1* | 8/2015 | Trombetta | A63F 13/497 463/24 |
| 2015/0251093 | A1* | 9/2015 | Trombetta | A63F 13/497 463/24 |
| 2016/0158656 | A1* | 6/2016 | Condrey | A63F 13/63 463/31 |
| 2016/0287987 | A1* | 10/2016 | Onda | A63F 13/86 |
| 2016/0292732 | A1* | 10/2016 | Kang | G06Q 30/0226 |
| 2017/0185622 | A1* | 6/2017 | Prahlad | G06F 11/1435 |
| 2017/0354880 | A1* | 12/2017 | Miura | A63F 13/23 |

FOREIGN PATENT DOCUMENTS

| | | |
|---|---|---|
| JP | 2009-254443 A | 11/2009 |
| JP | 2009-297221 A | 12/2009 |
| JP | 2010-220089 A | 9/2010 |
| JP | 2010-239990 A | 10/2010 |
| JP | 2011-15753 A | 1/2011 |
| JP | 2013-128586 A | 7/2013 |
| JP | 2014-106648 A | 6/2014 |
| JP | 5521104 B1 | 6/2014 |
| JP | 2014-171496 A | 9/2014 |
| JP | 2015/013102 A | 1/2015 |
| JP | 2015-13103 A | 1/2015 |
| WO | WO 2011/125265 A1 | 10/2011 |

OTHER PUBLICATIONS

"Gangan!! Battle Rush!" [online] http://www.gpara.com/infos/view/4012, Aug. 22, 2013, pp. 1-4, Retrieve Mar. 6, 2017.

Office Action dated Jan. 19, 2016 in Japanese Patent Application No. 2015-233905 (with English language translation).

Office Action dated Nov. 15, 2016 in Japanese Patent Application No. 2016-159551 (with English language translation).

"Explanation of the "ClaCla" Village", [Online], http//coc.game-k2.net/report/details/?d=191, Jun. 11, 2014, pp. 6 and 7, retrieved Nov. 8, 2016.

Japanese Office Action dated Apr. 21, 2015, issued in Japanese Patent Application No. 2015-014023 (with English translation).

Japanese Office Action dated Jun. 30, 2015, issued in Japanese Patent Application No. 2015-014023 (with English translation).

Japanese Office Action dated Sep. 1, 2015, issued in Japanese Patent Application No. 2015-014023 (with English translation).

"iOS Quick Start Guide", [online], retrieved Jan. 8, 2015.

Japanese Office Action dated Aug. 29, 2017 in U.S. Pat. No. 6,043,819 B (with English translation).

Decision on Opposition issued Jan. 16, 2018 in Japanese Patent No. 6043819 (with partial English language translation).

Notification of Reasons for Refusal issued in Japanese Application No. 2015-233905 dated Apr. 26, 2016 (with English translation), 6 pages.

Decision to Decline the Amendment issued in Japanese Application No. 2016-159551 dated Jun. 20, 2017 (with English translation), 7 pages.

Report of Reconsideration by Examiner before Appeal issued in Japanese Application No. 2016-159551 dated Nov. 15, 2017 (with English translation), 8 pages.

Argument and Written Correction Request dated Oct. 24, 2017 in corresponding Japanese Patent No. 6043819.

Notice of sending a copy of the Notice of Opposition, Amendment and Petition against the corresponding Japanese Patent No. 6043819 dated Aug. 7, 2017.

Notice of sending a copy of Argument against the corresponding Japanese Patent No. 6043819 dated Jan. 18, 2018.

Japanese Office Action dated Dec. 5, 2018 in corr. Japanese Patent Application No. 2017-167767, filed Aug. 31, 2017 (w/ English translation) 11 pp.

Nakano, Y., Visualization of user behavior in 3D virtual space, IPSJ SIG Technical Report, vol. 2005, No. 49, May 2005, pp. 49-54.

Notification of Reasons for Refusal issued in corresponding Japanese Application No. 2016-159551 dated Apr. 3, 2018 (with English translation).

Japanese Office Action dated Jul. 16, 2019, in Patent Application No. 2017-167767, 10 pages. (with unedited computer generated English translation).

Notice of Reasons for Refusal dated Apr. 13, 2021 in corresponding Japanese Patent Application No. 2020-066561 (with English translation)(8 pages).

* cited by examiner

FIG. 2

| Time stamp | Game title ID | Device ID | Game content ID subject to processing | Command | Command parameters |
|---|---|---|---|---|---|
| 1417612800 | GTID001 | DID00001 | CID0001 | Move | vx+=5, vy-=7 |
| 1417612801 | GTID001 | DID00001 | CID0004 | Skill | SkillID=7, px=140, py=130 |
| ... | ... | ... | ... | ... | ... |

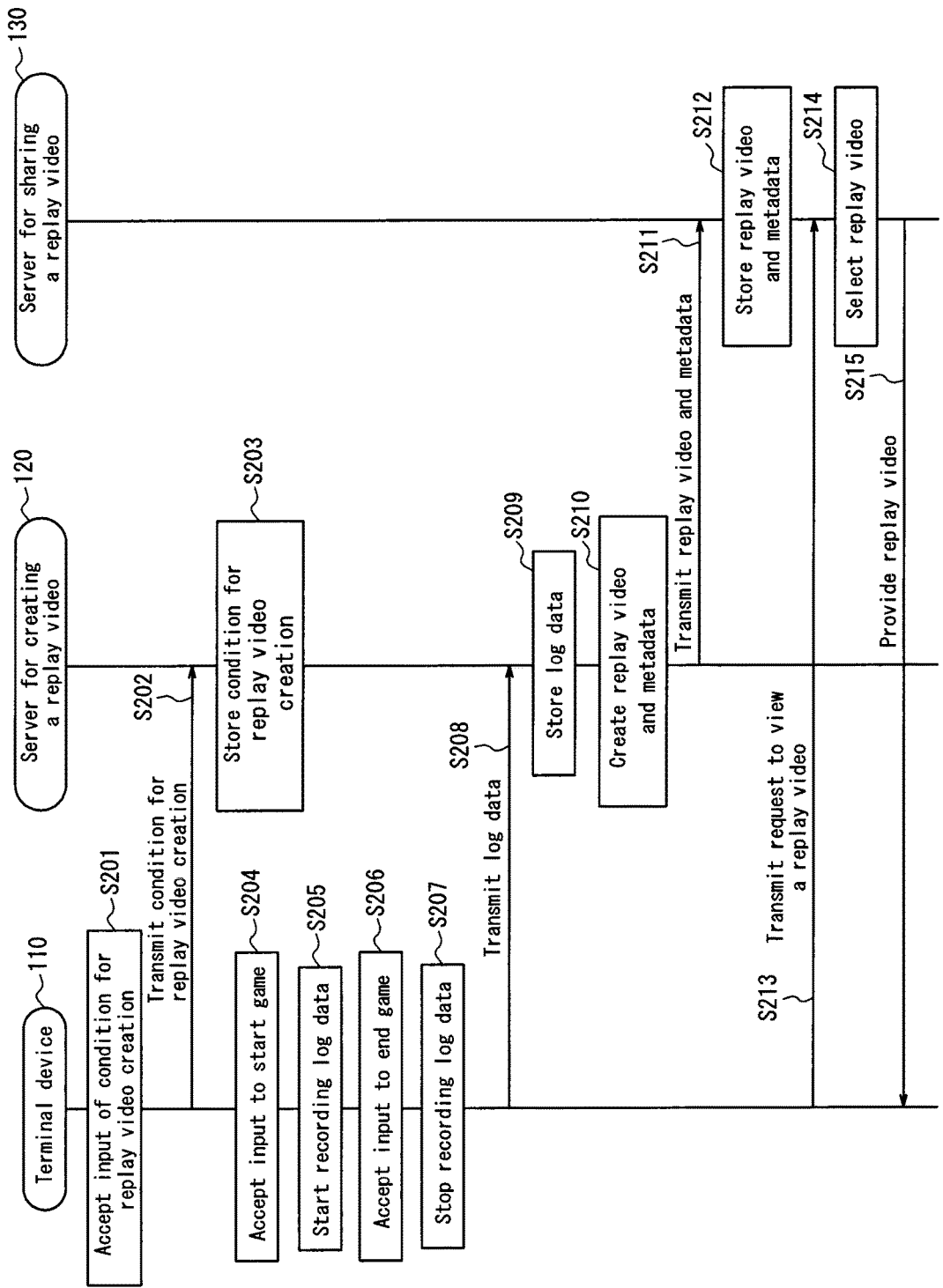

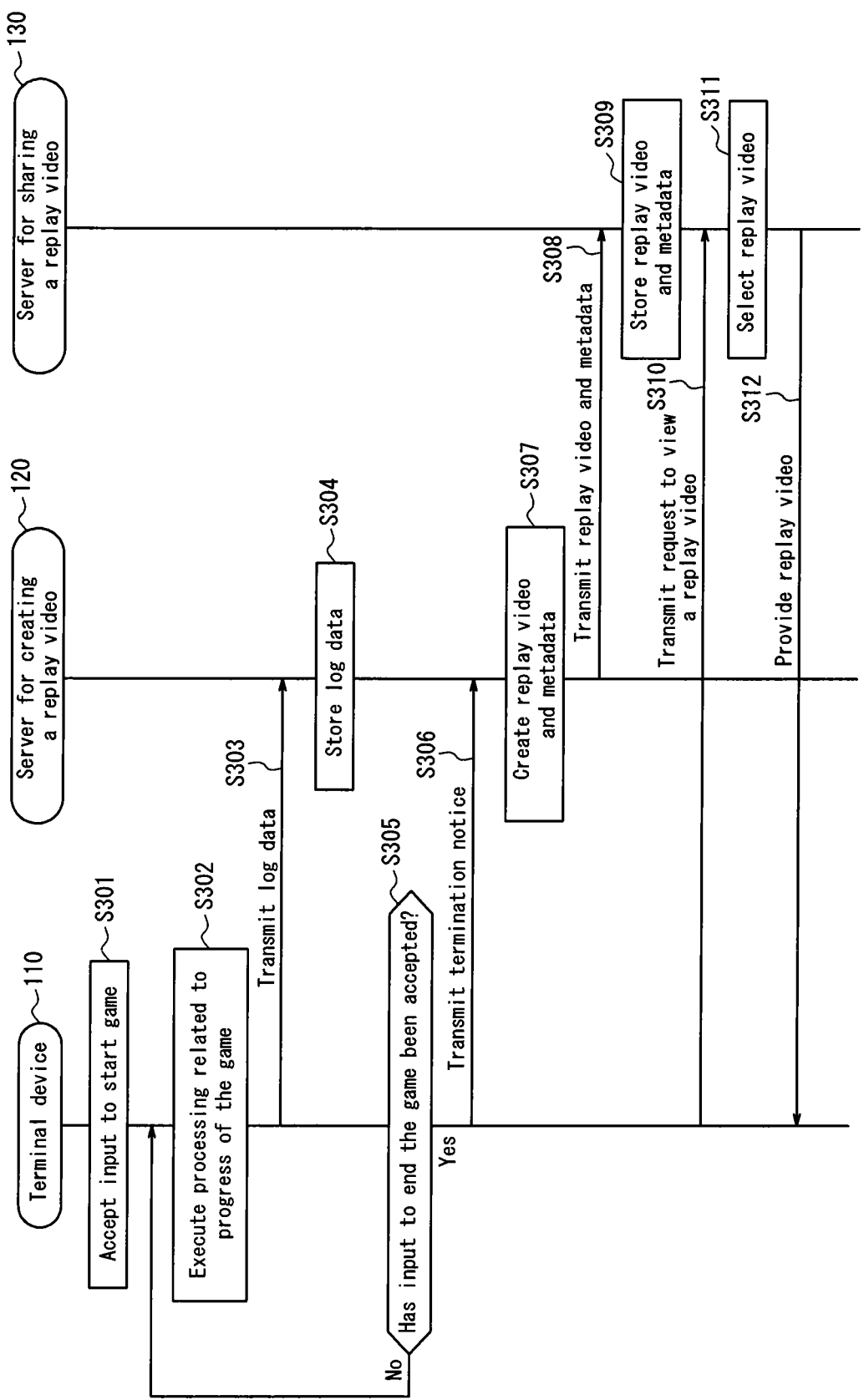

METHOD, NON-TRANSITORY COMPUTER-READABLE RECORDING MEDIUM, INFORMATION PROCESSING SYSTEM, AND INFORMATION PROCESSING DEVICE

CROSS-REFERENCE TO RELATED APPLICATION

This application claims priority to and the benefit of Japanese Patent Application No. 2015-014023, filed Jan. 28, 2015; the entire contents of which are incorporated herein by reference.

TECHNICAL FIELD

This disclosure relates to a method, a non-transitory computer-readable recording medium, an information processing system, and an information processing device.

BACKGROUND

A known technique allows a user playing a game to record a video of the screen when playing the game (for example, see "iOS Quick Start Guide", [online], retrieved Jan. 8, 2015 (NPL 1)). By replaying the recorded video, users can view the content of a game they played in the past.

CITATION LIST

Non-patent Literature
NPL 1: "iOS Quick Start Guide", [online], retrieved Jan. 8, 2015.

SUMMARY

When the user uploads a video onto a server that other users can access in order to share a recorded video with other users, however, the data of the video needs to be transmitted to the server. As compared for example to text data or the like, the data of the video may have a large volume and require a long time to upload. The user may find the upload time to be annoying. If the video upload fails and needs to be tried again, the user may consider the upload to be even more troublesome.

It would therefore be helpful to provide a method, non-transitory computer-readable recording medium, information processing system, and information processing device that are less troublesome for the user.

BRIEF DESCRIPTION OF THE DRAWINGS

In the accompanying drawings:
FIG. 2 schematically illustrates an example of log data in the information processing system of FIG. 1;
FIG. 5 is a sequence diagram illustrating an example of a sequence of operations to create and provide a replay video in the information processing system of Embodiment 2;
and
FIG. 6 is a sequence diagram illustrating an example of a sequence of operations to create and provide a replay video in the information processing system of Embodiment 3.

DETAILED DESCRIPTION

The disclosed embodiments are described below with reference to the drawings.

Embodiment 1

Figure 1:
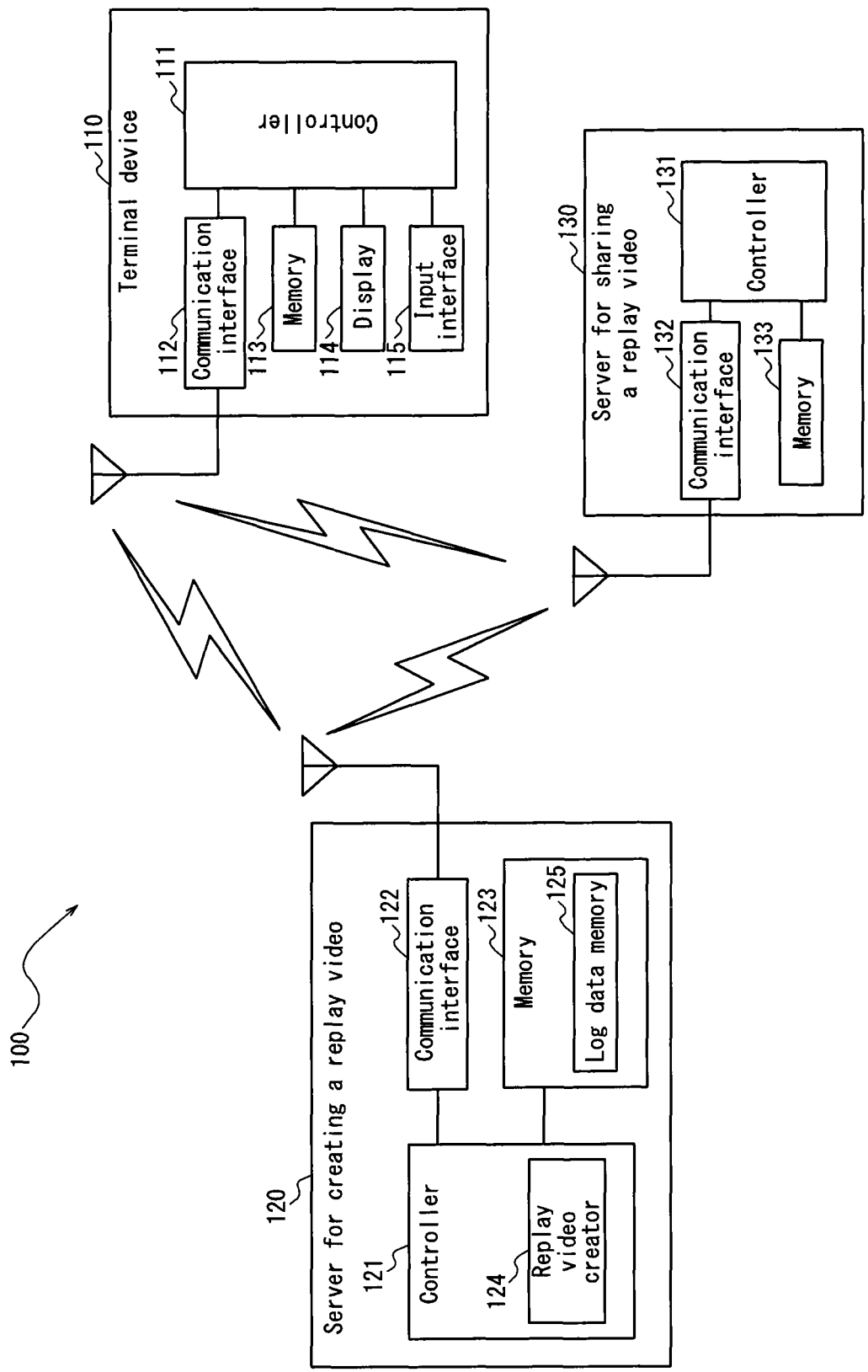
FIG. 1 is a functional block diagram of the main section of an information processing system according to Embodiment 1 of this disclosure.

FIG. 1 is a functional block diagram of the main section of an information processing system according to Embodiment 1 of this disclosure. An information processing system 100 includes a terminal device 110, a server 120 for creating a replay video, and a server 130 for sharing a replay video. In FIG. 1, only one terminal device 110 is illustrated for the sake of simplicity, but the information processing system 100 may include a plurality of terminal devices 110. The terminal device 110, server 120 for creating a replay video, and server 130 for sharing a replay video can connect to communicate with each other over a network, such as the Internet. The form of communication between the terminal device 110, server 120 for creating a replay video, and server 130 for sharing a replay video is not, however, limited to a network. The terminal device 110, server 120 for creating a replay video, and server 130 for sharing a replay video may instead communicate with each other over a wired or wireless connection.

In the information processing system 100, the user plays a game using the terminal device 110. The server 120 for creating a replay video creates a video (replay video) that re-creates screens (game screens) related to progress of the game played by the user on the terminal device 110. In other words, the server 120 for creating a replay video does not create the game screens that the user actually sees when playing the game, but rather creates a replay video in which different game screens are re-created. The replay video that is created by the server 120 for creating a replay video is stored in the server 130 for sharing a replay video. In the case of viewing a replay video, the user transmits a request to view a replay video from the terminal device 110 to the server 130 for sharing a replay video. In response to the request to view a replay video, the server 130 for sharing a replay video provides the stored replay video to the terminal device 110.

The terminal device 110 executes the game that the user plays. An application for the game executed by the terminal device 110 (game app) is, for example, installed in advance on the terminal device 110. On the terminal device 110, the game progresses based on input operations by the user to an input interface 115. The terminal device 110 includes a controller 111, a communication interface 112, a memory 113, a display 114, and the input interface 115.

The controller 111 is a processor that controls and manages the terminal device 110 overall, starting with the functional blocks of the terminal device 110. In this embodiment, for example when executing processing related to progress of the game, the controller 111 records log data of the processing related to progress of the game in the memory 113. Details on the log data are provided below. For example based on a predetermined input operation by the user to the input interface 115, the controller 111 transmits the log data recorded in the memory 113 to the server 120 for creating a replay video via the communication interface 112.

The communication interface 112 transmits and receives a variety of data to and from the server 120 for creating a replay video and the server 130 for sharing a replay video by wired or wireless communication. Based on control by the controller 111, the communication interface 112 for example transmits the log data stored in the memory 113 to the server 120 for creating a replay video. Based on control by the controller 111, the communication interface 112 also transmits the request to view a replay video to the server 130 for sharing a replay video.

The memory 113 stores a variety of information. The memory 113 for example stores log data based on control by the controller 111. After the stored log data are transmitted from the memory 113 to the server 120 for creating a replay video, the log data that were transmitted may be deleted based on control by the controller 111. The memory 113 also stores the game app of the game provided by the terminal device 110. Furthermore, the memory 113 stores a Software Development Kit (SDK) for the controller 111 to execute control related to recording the log data.

The display 114 is a display device such as a liquid crystal display, an organic EL display, or an inorganic EL display. The display 114 displays a variety of information. The display 114 for example displays game screens corresponding to progress of the game. The display 114 also displays the replay video provided by the server 130 for sharing a replay video.

The input interface 115 accepts operation input from the user. The input interface 115 may be configured with operation buttons (operation keys). When the terminal device 110 includes a touchscreen, the touchscreen functions as the input interface 115 by detecting contact of the user's finger, a stylus pen, or the like and accepting the contact as operation input.

Based on the log data received from the terminal device 110, the server 120 for creating a replay video creates a replay video of the game that the user played. The server 120 for creating a replay video includes a controller 121, a communication interface 122, and a memory 123.

The controller 121 is a processor that controls and manages the entire server 120 for creating a replay video, starting with the functional blocks of the server 120 for creating a replay video. In this embodiment, the controller 121 includes a replay video creator 124 that executes processing to create a replay video based on the log data. The replay video creator 124 executes the processing to create a replay video using an application that can create the replay video based on the log data. Such an application is for example stored in the memory 123 in advance. Specifically, the replay video creator 124 creates the replay video by re-creating the game screens displayed during gameplay with reference to the log data. The replay video creator 124 for example creates the replay video as a universal video file that differs from the game screens. Hence, even a user with a terminal device 110 on which dedicated software for replaying a particular file is not installed can easily view the replay video, thereby allowing more users to view the replay video easily.

The replay video creator 124 may create the replay video with a different method. For example, based on the log data, the replay video creator 124 may execute similar processing to the processing related to progress of the game executed on the terminal device 110, thereby reproducing game video. The replay video may then be created by capturing the reproduced game video.

Based on the log data, the replay video creator 124 creates information related to progress of the created replay video as metadata and associates the created metadata with the created replay video. For example, when the user issues a request to view a replay video using the terminal device 110, the metadata is used to select or search for the replay video that the user wishes to view.

The metadata for example includes information related to game content parameters such as names of skills, as described below. The metadata may also include predetermined information based on operation by the user that views the replay video or the user that played the game. The metadata for example includes the game title related to the game screens re-created by the replay video, information related to the user that played the game, and the like. The information related to the user that played the game for example includes information related to parameters associated with the user, such as the user's level in the game, information related to game contents used by the user in the game, and the like. The information related to the user may also include another application other than the application for executing processing to create the replay video or include information acquired with a predetermined sensor (sensor information). Specifically, the information related to the user for example may be information acquired from a Global Positioning System (GPS), a vibration sensor, or the like provided in the terminal device 110. By including such information, the metadata can associate more detailed information related to the user with the replay video. A user that wishes to view a replay video can also issue a request to view a replay video such that the request designates more detailed information.

The metadata may also include information related to elements of game progress and information related to the time of game progress. The information related to elements of game progress is associated with the time of game progress at which each element of game progress occurred. By transmitting a request to view a replay video that designates the element of game progress that the player wishes to view, the player can view a replay video related to the designated element. For example, suppose that the game played on the terminal device 110 is a game in which damage is inflicted on an opponent, and that the metadata includes an amount of damage inflicted on the opponent as an element of game progress. When the user transmits, from the terminal device 110, a request to view a replay video containing a scene in which a predetermined amount of damage or greater is inflicted, then the server 130 for sharing a replay video extracts the time of game progress associated with a scene in which the designated predetermined amount of damage or greater is inflicted and provides a replay video at the extracted time of game progress to the terminal device 110. When, for example, the user designates the scene in which the largest amount of damage is inflicted as the request to view a replay video, a video of the scene in which the largest amount of damage is inflicted is provided in the replay video to the terminal device 110. In this way, by the user inputting a predetermined element of game progress, replay video at the time corresponding to the element of game progress is provided to the user. In this example, the information related to the time of game progress is described as a "time stamp" in the description below of the log data in FIG. 2.

The replay video creator 124 may analyze the log data or sensor information and include information based on the analysis results in the metadata. For example, when the memory 123 stores a plurality of predetermined patterns related to the log data or sensor information, and the replay video creator 124 determines that the retrieved log data or sensor information has a predetermined correlation with one of the patterns stored in the memory 123, then information related to the pattern may be included in the metadata. In greater detail, for example assume that the memory 123 stores a pattern related to log data or sensor information for a game playable with one hand, and that the replay video creator 124 has determined that the retrieved log data or sensor information has a predetermined correlation with the pattern related to log data or sensor information for the game playable with one hand. In this case, the replay video creator 124 includes information indicating that the game is playable with one hand in the metadata. By including such information, the metadata can associate more detailed information related to the game with the replay video. A user that wishes to view a replay video can also issue a request to view a replay video such that the request designates more detailed information.

The metadata may for example include information (input information) that the user inputs from the terminal device 110. When other information included in the metadata that includes the input information is shared among a plurality of sets of metadata, the replay video creator 124 may store a pattern of the other information in the memory 123. In this way, based on the pattern of other information stored in the memory 123, the replay video creator 124 can automatically extract information included in the metadata.

The communication interface 122 transmits and receives a variety of data to and from the terminal device 110 and the server 130 for sharing a replay video by wired or wireless communication. The communication interface 122 for example receives the log data from the terminal device 110. The communication interface 122 also, for example, transmits the replay video created by the replay video creator 124 and the metadata associated with the replay video to the server 130 for sharing a replay video.

The memory 123 stores a variety of information. In this embodiment, the memory 123 includes a log data memory 125. Based on control by the controller 121, the log data memory 125 stores the log data that the server 120 for creating a replay video receives from the terminal device 110.

The server 130 for sharing a replay video stores the replay video that is created by the server 120 for creating a replay video. In response to a request to view a replay video from the terminal device 110, the server 130 for sharing a replay video provides the stored replay video to the terminal device 110 so that the user can view the replay video on the terminal device 110. The server 130 for sharing a replay video includes a controller 131, a communication interface 132, and a memory 133.

The controller 131 is a processor that controls and manages the entire server 130 for sharing a replay video, starting with the functional blocks of the server 130 for sharing a replay video. Upon the server 130 for sharing a replay video receiving a replay video and metadata from the server 120 for creating a replay video, the controller 131 stores the received replay video and metadata in the memory 133. In response to a request to view a replay video, the controller 131 also selects, from among replay videos stored in the memory 133, the replay video for which delivery was requested in the request to view a replay video and provides the selected replay video to the terminal device 110.

The communication interface 132 transmits and receives a variety of data to and from the terminal device 110 and the server 120 for creating a replay video by wired or wireless communication. The communication interface 132 for example receives the replay video from the server 120 for creating a replay video. The communication interface 132 also receives a request to view a replay video from the terminal device 110 and provides the replay video related to the request to view a replay video to the terminal device 110.

The memory 133 stores a variety of information. In this embodiment, in particular the memory 133 stores the replay video received from the server 120 for creating a replay video.

In this embodiment, as described above, the server 120 for creating a replay video and the server 130 for sharing a replay video are different server devices independent from each other. Instead of the server 120 for creating a replay video and the server 130 for sharing a replay video, however, the information processing system 100 may include one server device that has the functions of both the server 120 for creating a replay video and the server 130 for sharing a replay video.

Next, the log data are described. The log data are data that serve as the basis for the server 120 for creating a replay video to create a replay video and are any data with a smaller volume than the replay video. The log data are for example a character code such as ASCII data. In this disclosure, the log data are described below as being ASCII data. In other words, upon the user beginning the game using the terminal device 110, the controller 111 begins to record the ASCII log data in the memory 113. The controller 111 may, for example, begin to record the log data based on a predetermined operation by the user to record the log data. For example, when the user finishes playing the game, the controller 111 stops recording the log data. The controller 111 may, for example, stop recording the log data based on a predetermined operation by the user to stop recording the log data. When the game provided by the terminal device 110 can, for example, be divided up into certain sections of gameplay, the controller 111 may stop recording the log data at the end of each section. Specifically, for example when the game provided by the terminal device 110 is a game for playing a soccer match, the controller 111 may stop recording the log data at the end of each match. In this case, the controller 111 begins to record the log data of the next game that is played after recording of the log data is stopped.

The controller 111 of the terminal device 110 records the content of processing corresponding to content of the game played on the terminal device 110 in the memory 113 as log data. As one example, the terminal device 110 of this embodiment provides a game in which a plurality of players use game contents associated with each player to compete with a predetermined opponent. The game contents are electronic data used in the game and include, for example, cards, items, characters, avatars, and the like. The game contents are electronic data that, in accordance with game progress, may be acquired, held, used, managed, traded, combined, strengthened, sold, discarded, and/or transferred by players, but the forms of use for the game contents are not limited to the forms specified in this disclosure. Each game content has unique parameters (game content parameters). The game content parameters include the level of the game content, combat strength such as attack points and defense points of the game content, combat means such as attack means and defense means of the game content, skill information of the game content, the level of a skill of the game content, information on the avatar of the game content, an attribute of the game content, an index indicating the rarity of the game content, and the like. The skill is a particular ability of the game content that produces a predetermined effect in the game, such as a lethal skill of the game content. The index indicating the rarity of the game content may be expressed by levels such as normal, rare, super-rare, ultra-rare, and the like.

FIG. 2 schematically illustrates an example of log data in this embodiment. As illustrated in FIG. 2, the log data in this embodiment include a time stamp, a game title ID, a device ID, a game content ID subject to processing, a command, and command parameters as items related to the log data.

The time stamp is information indicating the date and time that the processing in the log data was executed and is for example recorded as Unix time.

The game title ID is unique information on each game title and uniquely identifies the game title for which the processing in the log data was executed. In other words, the game title ID indicates the game title of the game that the user played using the terminal device 110.

The device ID is unique information for each device and uniquely identifies the device on which the log data were recorded. In this embodiment, since the terminal device 110 records the log data, the ID associated with the terminal device 110 is recorded as the device ID.

The game content ID subject to processing is unique information for each game content that uniquely identifies the game content that was subject to the processing for progress in the game related to the log data. The example in FIG. 2 indicates that processing for game progress was executed for the game content associated with the ID "CID0001" and the game content associated with the ID "CID0004".

The command is information indicating the processing for progress in the game related to the log data. For example, the command "Move" in FIG. 2 indicates processing to move a game content on a field where the game is played, and the command "Skill" indicates processing related to a skill associated with the game content.

The command parameters are information indicating the content of a command related to the log data. For example, the command parameters "vx+=5, vy-=7" associated with the "Move" command in FIG. 2 indicate that the coordinates of the game content are moved by 5 in the positive direction along the x-axis and by 7 in the negative direction along the y-axis. The command parameters "Ski11ID=7, px=140, py=130" associated with the "Skill" command in FIG. 2 indicate that, among the unique IDs of the skills, processing was executed for the skill associated with ID "7" at a position identified by x-coordinate 140 and y-coordinate 130 on the field where the game is played.

Accordingly, to summarize, among the log data in FIG. 2, the log data related to the time stamp "1417612800" indicate that at the date and time indicated by the time stamp "1417612800", in the game with the game title "GTID001", the terminal device 110 associated with "DID00001" executed processing to move the game content associated with "CID0001" on the game field by 5 in the positive direction along the x-axis and by 7 in the negative direction along the y-axis. For example, when the game content associated with "CID0001" is a game content associated with the user playing the game using the terminal device 110, the controller 111 executes the processing for movement based on an input operation by the user to the input interface 115 and records log data related to the processing for movement.

Among the log data in FIG. 2, the log data related to the time stamp "1417612801" indicate that at the date and time indicated by the time stamp "1417612801", in the game with the game title "GTID001", the terminal device 110 associated with "DID00001" executed processing, on the game content associated with "CID0004", for the skill associated with ID "7" at the position identified by x-coordinate 140 and y-coordinate 130 on the field where the game is played. For example, when the game content associated with "CID0004" is a game content that the controller 111 of the terminal device 110 automatically operates, then upon operating the game content, the controller 111 executes processing for the skill and records the log related to the processing for the skill.

The log data illustrated in FIG. 2 are only an example, and the log data are not limited to the log data illustrated in FIG. 2. Furthermore, the items related to the log data are not limited to the time stamp, game title ID, device ID, game content ID subject to processing, command, and command parameters illustrated in FIG. 2. The log data may include other items, for example in accordance with the content of the game played on the terminal device 110.

The log data recorded in this way are transmitted as ASCII data from the terminal device 110 to the server 120 for creating a replay video either based on user operation or automatically. In this embodiment, since the log data are ASCII data, a recorded sequence of log data may be divided into a plurality of sections and transmitted to the server 120 for creating a replay video.

Once the server 120 for creating a replay video receives the log data from the terminal device 110, the controller 121 stores the received log data in the log data memory 125.

Based on the log data stored in the log data memory 125, the replay video creator 124 executes processing to create a replay video. Specifically, the replay video creator 124 executes processing to create a replay video by re-creating progress in the game as a video along the time stamps recorded as log data, using the game contents recorded as log data in accordance with the commands and command parameters recorded as log data.

The created replay video is transmitted from the server 120 for creating a replay video to the server 130 for sharing a replay video and stored in the memory 133.

Figure 3:
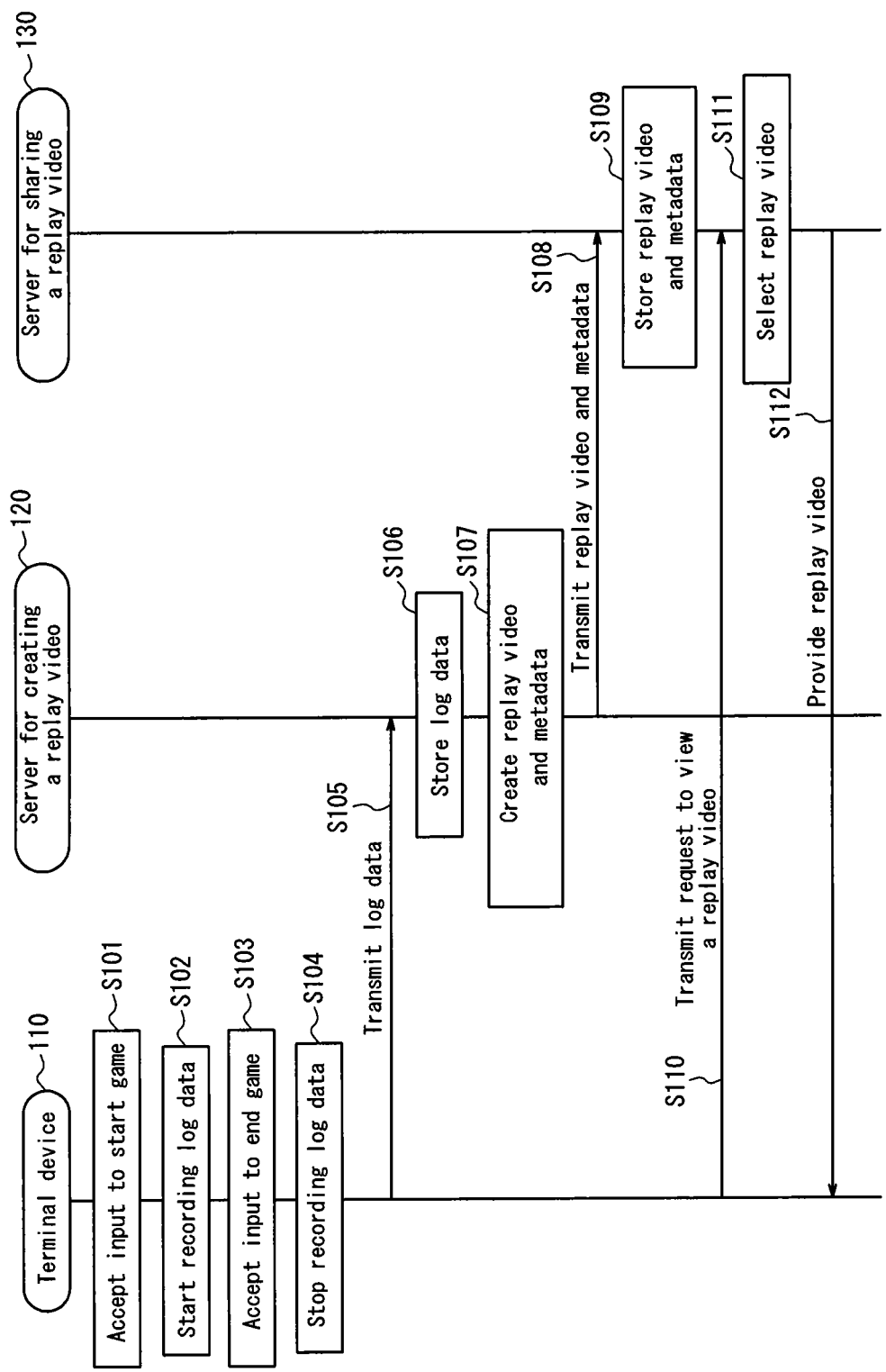
FIG. 3 is a sequence diagram illustrating an example of a sequence of operations to create and provide a replay video in the information processing system of Embodiment 1.

Next, with reference to FIG. 3, an example of a sequence of operations to create and provide a replay video in the information processing system 100 of Embodiment 1 is described.

First, based on a predetermined input operation from the user for starting the game, the terminal device 110 accepts input to start the game with the controller 111 (step S101). Upon accepting input to start the game, the terminal device 110 starts recording log data with the controller 111 (step S102). Once the user finishes playing the game and performs a predetermined input operation to end the game, based on the user's input operation, the terminal device 110 accepts input to end the game with the controller 111 (step S103). Upon accepting input to end the game, the terminal device 110 stops recording the log data with the controller 111 (step S104). The terminal device 110 transmits the recorded log data to the server 120 for creating a replay video via the communication interface 112 (step S105).

Upon receiving the log data from the terminal device 110 via the communication interface 122, the server 120 for creating a replay video stores the received log data in the log data memory 125 with the controller 121 (step S106). Based on the log data stored in the log data memory 125, the server 120 for creating a replay video creates a replay video and metadata with the replay video creator 124 (step S107). The server 120 for creating a replay video transmits the replay video and metadata that were created in step S107 from the communication interface 122 to the server 130 for sharing a replay video (step S108).

Upon receiving a replay video and metadata from the server 120 for creating a replay video via the communication interface 132, the server 130 for sharing a replay video stores the received replay video and metadata in the memory 133 with the controller 131 (step S109).

Once the user performs a predetermined input operation to transmit a request to view a replay video using the terminal device 110, the terminal device 110 transmits the request to view a replay video to the server 130 for sharing a replay video via the communication interface 112 (step S110).

Upon receiving the request to view a replay video from the terminal device 110, the server 130 for sharing a replay video selects the replay video for which delivery was requested in the request to view a replay video with the controller 131 (step S111). Via the communication interface 132, the server 130 for sharing a replay video then provides the selected replay video to the terminal device 110 (step S110).

As described above, according to the information processing system 100 of this embodiment, the terminal device 110 records information related to game screens as log data, which are ASCII data, and transmits the log data to the server 120 for creating a replay video. The server 120 for creating a replay video creates the replay video based on the log data and transmits the created replay video to the server 130 for sharing a replay video. This way, when the user uploads the replay video to the server 130 for sharing a replay video, the ASCII log data are transmitted from the terminal device 110 to the server 120 for creating a replay video. Accordingly, the amount of data transmitted by the terminal device 110 decreases as compared to when uploading the replay video by direct transmission, thereby shortening the amount of time for transmitting the data from the terminal device 110. Hence, the information processing system 100 is less troublesome for the user.

As described above, while the user is playing the game, the terminal device 110 records information related to game screens as log data, which are ASCII data. Therefore, as compared to when the actual game screens are video recorded or the like, the processing load for recording on the terminal device 110 can be reduced. Since the information stored by the memory 123 of the server 120 for creating a replay video is also log data, the volume of data is smaller than when storing the actual game screens. Therefore, a larger amount of information can be stored, such as information related to game progress over an extended period of time by the same user, information related to processing of a game conducted by a plurality of users, and the like.

Since the server 120 for creating a replay video creates the game screens in a universal video file format, a user who only wishes to view the replay video without actually playing the game can view the replay video with a universal video replay tool, a browser, or the like even if the user does not possess the game that was played or a dedicated tool or the like for viewing game video.

Furthermore, the user that views the replay video can search the replay video by referring to detailed information included in the metadata. Therefore, the user can search replay videos even without having specific information related to a particular replay video. For example, even if users only have an idea of what type of games they would like to view (such as a game that ends in a short time, a game having at most a predetermined number of types of input operations during gameplay, a roleplaying game, or the like), users can search across replay videos related to a plurality of games based on log data, sensor information, or the like.

According to the information processing system 100 of this embodiment, the burden on users can be reduced, since users themselves do not need to execute processing for recording a replay video simultaneously while playing the game.

Since the log data are ASCII data, the terminal device 110 can also divide up the recorded log data so as to transmit the log data over multiple transmissions.

Embodiment 2

In Embodiment 1, the case of the replay video creator 124 creating the replay video based on the log data stored in the log data memory 125 was described. In Embodiment 2, the case is described of the replay video creator 124 creating the replay video based not only on the log data stored in the log data memory 125, but also based on a condition for replay video creation stored in a memory 126 for the condition for replay video creation, which is further provided in the memory 123.

Figure 4:
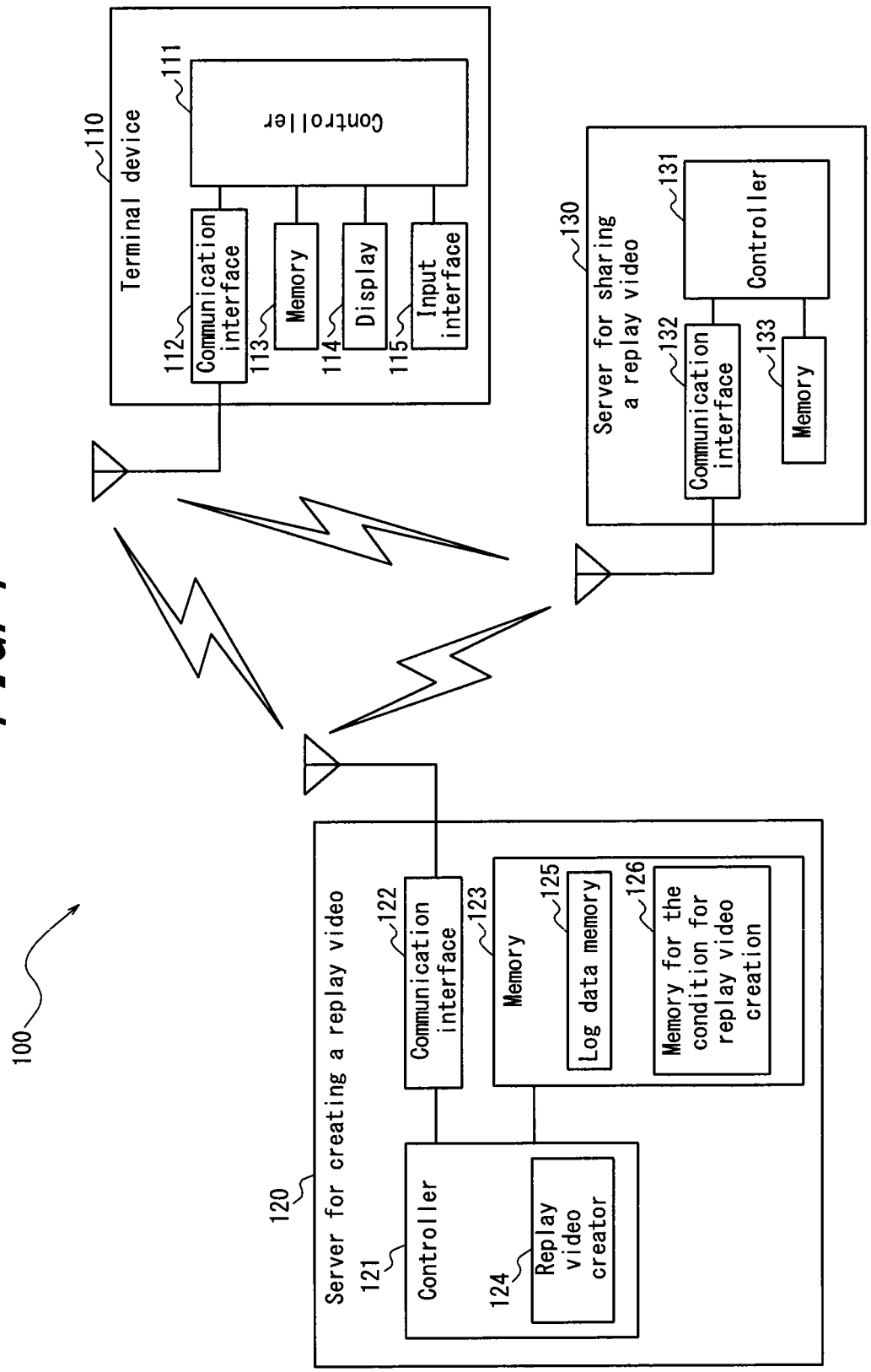
FIG. 4 is a functional block diagram of the main section of an information processing system according to Embodiment 2 of this disclosure.

FIG. 4 is a functional block diagram of the main section of an information processing system according to Embodiment 2 of this disclosure. In the information processing system 100 according to Embodiment 2, the memory 123 of the server 120 for creating a replay video includes the memory 126 for the condition for replay video creation in addition to the log data memory 125. The explanation below omits points that are the same as in Embodiment 1, focusing instead on the differences.

The memory 126 for the condition for replay video creation stores the condition for replay video creation. The condition for replay video creation is a predetermined condition related to the replay video created by the replay video creator 124. The condition for replay video creation is, for example, input by the user using the input interface 115 of the terminal device 110 and is transmitted from the communication interface 112 to the server 120 for creating a replay video. Based on control by the controller 121, the memory 126 for the condition for replay video creation stores, in advance, the condition for replay video creation received from the terminal device 110.

In Embodiment 2, the replay video creator 124 creates the replay video based on the log data stored in the log data memory 125 and the condition for replay video creation stored in the memory 126 for the condition for replay video creation. The following describes examples of the condition for replay video creation and the replay video that is created.

The condition for replay video creation is, for example, to extract log data that satisfy a particular condition by referring to any of the items related to the log data. In this example, the log data illustrated in FIG. 2 are assumed to be stored in the log data memory 125. Further suppose that the user for example operates the terminal device 110 to input a condition for replay video creation so as to extract log data for which the game content ID subject to processing is "CID0001". In this case, when creating the replay video, the replay video creator 124 refers to this condition for replay video creation and extracts, from among the log data, log data for which the game content ID subject to processing is "CID0001". Based on the extracted log data, the replay video creator 124 creates a replay video. The replay video creator 124 may, for example, create a replay video that includes processing related to the log data by creating a replay video of a predetermined length of time before and after the extracted log data. This predetermined length of time may be stored in advance in the memory 123 or may be determined based on user input to the input interface 115. In this example, since the replay video creator 124 creates a replay video regarding a game content with an ID of "CID0001", the replay video is created with video related to the game content with the ID of "CID0001".

As another example, suppose that the user operates the terminal device 110 to input a condition for replay video creation so as to extract log data for which the command is "Skill". In this case, when creating the replay video, the replay video creator 124 refers to this condition for replay video creation and extracts, from among the log data, log data for which the command is "Skill". Based on the extracted log data, the replay video creator 124 creates a replay video. In this example, since the replay video creator 124 creates a replay video regarding processing for the command "Skill", the replay video is created with video related to skills of the game contents in the game. By the user identifying a specific "SKillID" as the condition for replay video creation, a game video regarding a particular skill can be created. In this way, the user for example can create a replay video in which scenes that the user particularly wishes to view are extracted from among game screens.

Examples of the condition for replay video creation prescribing extraction of log data that satisfy a particular condition are not limited to the above-described examples. The user may set the condition for replay video creation so as to extract log data that satisfy a particular condition for any other item related to the log data. For example, with regard to the time stamp, the user can set the condition for replay video creation to extract log data for a predetermined time period, thereby creating a replay video that is a clip of the predetermined time period. With such a condition for replay video creation, the user can create a particular scene, from the entire game that was played, as a replay video. For example, if the user is a corporation providing a game, then the user can create a video that introduces the game for promotional purposes by creating, as the replay video, a scene that whets consumer appetite for the game.

For example, by setting the condition for replay video creation to be a condition for extracting log data excluding log data of a predetermined time period, the user can create a replay video that excludes a scene the user does not wish to share from among the entire game that was played. Therefore, if for example the user is a corporation providing a game, then the user can create a video that introduces the game for promotional purposes by creating a replay video that excludes scenes depicting content that the user does not want to publicize.

The condition for replay video creation may, for example, be to replace predetermined processing related to the log data with processing in a different format. For example, if a cruel image is displayed on the game screen for processing related to the skill for which the skill ID is "SkillID=7", the user can set the condition for replay video creation so as to replace the expression of the skill "SkillID=7" with a different format that does not display a cruel image. In this case, when creating the replay video, the replay video creator 124 refers to this condition for replay video creation and extracts, from among the log data, log data for which processing for "SkillID=7" was executed. When creating a replay video based on the extracted log data, the replay video creator 124 creates the replay video by replacing the expression of the skill in the game screen with the expression designated by the user as the condition for replay video creation. In this way, even if a cruel image is displayed in the game when the game is actually played, a replay video that does not include the cruel image can be created. This approach is particularly effective when the replay video might be shared with children to whom cruel images should not be shown, since replay videos without cruel images can be created.

The user can also, for example, set the condition for replay video creation so as to create a replay video by replacing a game content corresponding to a predetermined game content ID subject to processing with a different form (appearance) than the form in the game that was played. For example, by setting such a condition for replay video creation for the game content "CID0001", the replay video creator 124 creates the replay video so that the game content "CID0001" is displayed in a different form than the form in the game that was actually played. When, for example, the game content "CID0001" is a character, then in accordance with the condition for replay video creation, the character of the replay video that is created is displayed as a different character than the character displayed on the game screens of the game that was actually played, or the character of the replay video that is created is displayed in different clothing than the character displayed in the game that was actually played. In this way, the user can cause the content of the game that was played to be displayed in the replay video in a different form than in the game screens, allowing the user to enjoy changes in form in the replay video.

When, for example, the user sets the condition for replay video creation so as to create the replay video by making the game content with a predetermined game content ID semi-transparent or transparent, then based on the condition for replay video creation, the replay video creator 124 creates the replay video so that the predetermined game content is displayed as being semi-transparent or transparent. The user can thus change the form of display for each game content. As a result of the designation of game contents to display as semi-transparent or transparent in the condition for replay video creation, the replay video creator 124 can create a replay video that draws attention to a particular game content that is not semi-transparent or transparent.

Next, with reference to FIG. 5, an example of a sequence of operations to create and provide a replay video in the information processing system 100 of Embodiment 2 is described.

First, based on a predetermined input operation by the user to input the condition for replay video creation, the terminal device 110 accepts input of the condition for replay video creation with the controller 111 (step S201). Upon accepting input of the condition for replay video creation, the terminal device 110 transmits the condition for replay video creation to the server 120 for creating a replay video via the communication interface 112 (step S202).

Upon receiving the condition for replay video creation from the terminal device 110 via the communication interface 122, the server 120 for creating a replay video stores the received condition for replay video creation in the memory 126 for the condition for replay video creation with the controller 121 (step S203).

Based on a predetermined input operation from the user for starting the game, the terminal device 110 accepts input to start the game with the controller 111 (step S204). Subsequent steps S205 to S209 are similar to steps S102 to S106 in FIG. 3, and hence a description thereof is omitted.

Upon storing the log data in step S209, the server 120 for creating a replay video creates a replay video and metadata based on the log data stored in the log data memory 125 and on the condition for replay video creation stored in the memory 126 for the condition for replay video creation (step S210). The server 120 for creating a replay video transmits the replay video and metadata that were created in step S210 from the communication interface 122 to the server 130 for sharing a replay video (step S211). Subsequent steps S212 to S215 are similar to steps S109 to S112 in FIG. 3, and hence a description thereof is omitted.

As described above, according to the information processing system 100 of this embodiment, the user can input the condition for replay video creation using the terminal device 110. The server 120 for creating a replay video receives the condition for replay video creation that the user input into the terminal device 110 and creates the replay video based on the log data and the condition for replay video creation. Therefore, by setting the condition for replay video creation, the user can have any replay video that the user desires be created.

In the information processing system 100, information related to game screens is recorded as log data. Therefore, as long as the log data are stored in the memory 123 of the server 120 for creating a replay video, the user can have replay videos be created under a variety of conditions by setting the condition for replay video creation, without having to play the game again and record the game screens.

Embodiment 3

In Embodiments 1 and 2, the case was described of the controller 111 of the terminal device 110 recording the log data in the memory 113 and transmitting the recorded log data to the server 120 for creating a replay video. In Embodiment 3, the case is described of the controller 111 transmitting the log data to the server 120 for creating a replay video via the communication interface 112 each time processing related to progress of the game is executed.

A functional block diagram of the main section of an information processing system according to Embodiment 3 is similar to FIG. 1 or FIG. 4. Here, Embodiment 3 is described with reference to FIG. 1. In Embodiment 3, when the user plays the game using the terminal device 110, the controller 111 transmits log data to the server 120 for creating a replay video via the communication interface 112 each time processing related to progress of the game is executed. For example, the controller 111 transmits the log data to the server 120 for creating a replay video via the communication interface 112 from when the user begins the game until the user ends the game. In other words, upon accepting input to end the game based on a predetermined input operation to the terminal device 110 by the user, the controller 111 stops transmitting the log data. The controller 111 may, for example, stop transmitting the log data based on a predetermined operation by the user to stop recording the log data. When the controller 111 stops transmitting the log data, the controller 111 may transmit a termination notice, from the terminal device 110 to the server 120 for creating a replay video, indicating that transmission of the log data has stopped.

Once the server 120 for creating a replay video receives the log data from the terminal device 110, the controller 121 stores the received log data in the log data memory 125. The replay video creator 124 creates a replay video based on the log data stored in the log data memory 125.

Next, with reference to FIG. 6, an example of a sequence of operations to create and provide a replay video in the information processing system 100 of Embodiment 3 is described.

First, based on a predetermined input operation from the user for starting the game, the terminal device 110 accepts input to start the game with the controller 111 (step S301). Once the game starts, the controller 111 executes processing related to progress of the game (step S302). Each time the controller 111 executes processing related to progress of the game in step S302, the controller 111 transmits log data related to the processing to the server 120 for creating a replay video via the communication interface 112 (step S303).

Upon receiving the log data from the terminal device 110, the server 120 for creating a replay video stores the received log data in the log data memory 125 (step S304).

In the terminal device 110, the controller 111 determines whether input to end the game has been accepted (step S305). When the controller 111 determines that input to end the game has not been accepted (step S305: No), the processing flow transitions to step S302, and the controller 111 executes processing related to progress of the game. Conversely, when the controller 111 determines that input to end the game has been accepted (step S305: Yes), the controller transmits a termination notice to the server 120 for creating a replay video via the communication interface 112 (step S306).

After receiving the termination notice, the server 120 for creating a replay video creates a replay video and metadata based on the log data stored in the log data memory 125 (step S307). Subsequent steps S309 to S312 are similar to steps S109 to S112 in FIG. 1, and hence a description thereof is omitted.

As described above, according to the information processing system 100 of this embodiment, when the terminal device 110 executes processing related to progress of the game, the terminal device 110 transmits log data related to the processing to the server 120 for creating a replay video. In this way, a replay video in which game screens of the game played by the user are re-created is shared on the server 130 for sharing a replay video even if the user does not perform an operation to transmit log data from the terminal device 110 to the server 120 for creating a replay video. In other words, with the information processing system 100 according to this embodiment, a replay video can be shared without even making the user aware of the time it takes to upload the replay video.

In a real-time multiplayer game in which a plurality of users play a game simultaneously by competing or cooperating, log data for the plurality of users are necessary in order to create a replay video. Therefore, the information processing system 100 of Embodiment 3 is effective.

Although embodiments of this disclosure have been described based on examples and on the accompanying drawings, it is to be noted that various changes and modifications will be apparent to those skilled in the art based on this disclosure. Therefore, such changes and modifications are to be understood as included within the scope of this disclosure. For example, the functions and the like included in the units, steps, and the like may be reordered in any logically coherent way. Furthermore, units, steps, and the like may be combined into one or divided.

For example, in Embodiment 2, when the log data include items other than those illustrated in FIG. 2 in accordance with the content of the game played on the terminal device 110, the user can set the condition for replay video creation with regard to such other items.

For example, when the game played on the terminal device 110 is a game displayed in 3D, the log data may include perspective information related to the perspective from which the game screens were displayed on the display 114 of the terminal device 110. When, for example, the user sets the condition for replay video creation so as to create a replay video by changing the perspective, the replay video creator 124 creates the replay video from a predetermined perspective designated by the user. With such a change in perspective, for example when the game played on the terminal device 110 is an action game, sports game, or the like, the user can view a replay video in which movement in the game is seen from a desired position.

When, for example, the game played on the terminal device 110 has a chat function to display a chat by a plurality of players, the log data may include chat information related to the chat displayed on the game screen in the game on the terminal device 110. When, for example, the user sets the condition for replay video creation so as to create a replay video by displaying or hiding the chat, the replay video creator 124 creates a replay video in which the chat is displayed or hidden in accordance with the condition for replay video creation. The user may also, for example, set the condition for replay video creation to display only a particular chat. In this case, the replay video creator 124 creates a replay video in which only the particular chat is displayed.

The log data may, for example, include input operation information. The input operation information is information related to the input operations that the user performed on the input interface 115 during the game. For example, when the input interface 115 is an operation button, the input operation information is information identifying the button that the user pressed. When the input interface 115 is implemented as a touchscreen, the input operation information is information related to the operation that the user performed on the touchscreen, such as a touch operation or a flick operation, and related to the position (coordinates) of the touchscreen where the operation was performed.

When, for example, the user sets the condition for replay video creation so as to display the input operation information, the replay video creator 124 creates a replay video that includes the input operation information. In other words, for example when the game played on the terminal device 110 progresses based on input operations to the touchscreen, then the operation that the user performed in the game, such as a touch operation or a flick operation, and the position of the touchscreen where the operation was performed are included in the replay video that is created. Accordingly, the user that views the created video can learn which input operations resulted in which processing being performed, and how the game consequently progressed.

To include the input operation information in the replay video, the user may, for example, set the condition for replay video creation so as to display the input operation information at a predetermined time (such as one second) before the input operation. In this case, in the replay video that is created by the replay video creator 124, the operation performed by the user in the game is displayed at a predetermined time before the operation is performed. Accordingly, the user that views the created replay video can learn what kind of input operation is the basis for processing that appears in the replay video after the predetermined time.

In Embodiment 2, the user may input the condition for replay video creation into the terminal device 110 after the log data are transmitted from the terminal device 110 to the server 120 for creating a replay video. The condition for replay video creation that is input is transmitted from the terminal device 110 to the server 120 for creating a replay video and stored in the memory 126 for the condition for replay video creation. Based on the newly stored condition for replay video creation, the replay video creator 124 creates a replay video. In this way, even after the log data are transmitted, the user can input the condition for replay video creation into the terminal device 110 and cause the server 120 for creating a replay video to create a replay video that the user wants. This approach is particularly effective when the user sets a condition for replay video creation so as to create a video that the user has come to want after the log data are transmitted from the terminal device 110 to the server 120 for creating a replay video.

In Embodiments 1 to 3, when viewing the replay video, the user may designate a predetermined viewing condition related to viewing. The viewing condition is a condition that designates a predetermined portion within the replay video that the user has selected to view. When the user designates the viewing condition, the terminal device 110 refers to the metadata associated with the replay video provided by the server 130 for sharing a replay video, extracts scenes designated by the viewing condition, and displays the scenes on the display 114. In this way, the user can designate and view a desired scene within the replay video.

In Embodiments 1 to 3, the server 120 for creating a replay video may be a dedicated server for creating a replay video related to one game title or may be a server capable of creating replay videos related to a plurality of game titles. When the server 120 for creating a replay video is configured to be capable of creating replay videos related to a plurality of game titles, the replay video creator 124 refers to the "game title ID" of the log data illustrated in FIG. 2 to identify the game title played by the user on the terminal device 110. The replay video creator 124 then creates a replay video based on a file, which corresponds to the identified game title and is stored in advance in the memory 123, for creating a replay video.

In the information processing system 100 of the above embodiments, the screens for game progress may be displayed on the terminal device 110 by Web display based on data generated by a predetermined server device, and other menu screens and the like may be displayed by native display with a native application installed on the terminal device 110. In this way, the information processing system 100 may be a hybrid game in which a server device and the terminal device 110 are each responsible for a portion of processing.

An information processing device, such as a computer or a cellular phone, may be suitably used to function as the server 120 for creating a replay video of the above embodiments. Such an information processing device may be configured by storing a program, containing a description of the processing to implement the functions of the server 120 for creating a replay video in the above embodiments, in the memory 123 of the server 120 for creating a replay video, and having the CPU of the server 120 for creating a replay video read and execute the program.

The invention claimed is:

1. A method executed by an information processing system, the method comprising:
   acquiring, from a first terminal device that displays game screens corresponding to a gameplay of a game on a display, log data related to the gameplay of the game during a time period, the log data generated by the first terminal device, the game progressed on the first terminal device based on an input operation from a user;
   creating, based on the log data, a video that replays the game screen corresponding to the gameplay during the time period on the first terminal device;
   acquiring, from the first terminal device, operation information indicative of the input operation performed on an input interface of the first terminal device by the user in the game;

generating gameplay information related to the gameplay during the time period on the first terminal device based on the log data;

generating metadata based on the gameplay information and the operation information;

associating the metadata with the video; and outputting the video and associated metadata for display on a second terminal device, wherein a recording of the log data is started after the gameplay is started, and the recording of the log data is stopped after the gameplay is completed, wherein the video is generated based on the log data after the recording of the log data is stopped.

2. The method of claim 1, further comprising:

storing, in a memory, a condition relating to creation of the video, wherein the creating includes creating the video based on the log data and on the condition relating to creation of the video.

3. The method of claim 2, wherein the condition is a condition for extracting, from the log data, log data that satisfies a predetermined condition, and the creating includes creating the video based on the extracted log data.

4. The method of claim 2, wherein the condition is a condition for extracting, from the log data, log data that satisfies a predetermined condition and for replacing processing related to the extracted log data with processing in a different format, and the creating includes creating the video by replacing processing related to the extracted log data with processing in the different format.

5. The method of claim 1, wherein the log data includes character code.

6. The method of claim 1, further comprising:

replacing a predetermined processing, in a first format and related to the log data, with processing in a second format different from the first format.

7. The method of claim 1, wherein the creating the video includes creating a universal video file that is outputted to the second terminal device.

8. The method of claim 1, wherein the metadata is generated after the recording of the log data is stopped.

9. The method of claim 1, wherein the input interface comprises at least one of an operation button or a touchscreen, and the input operation comprises at least one of a press operation of the operation buttons, a touch operation on the touchscreen, or a flick operation on the touchscreen.

10. One or more non-transitory computer-readable recording media configured to store instructions, which when executed by an information processing system, cause the information processing system to:

acquire, from a first terminal device that displays game screens corresponding to a gameplay of a game on a display, log data related to the gameplay of the game during a time period, the log data generated by the first terminal device, the game progressed on the first terminal device based on an input operation from a user;

create, based on the log data, a video that replays the game screen corresponding to the gameplay during the time period on the first terminal device;

acquire, from the first terminal device, operation information indicative of the input operation performed on an input interface of the first terminal device by the user in the game;

generate gameplay information related to the gameplay during the time period on the first terminal device based on the log data;

generate metadata based on the gameplay information and the operation information;

associate the metadata with the video; and output the video and associated metadata for display on a second terminal device, wherein, a recording of the log data is started after the gameplay is started, and the recording of the log data is stopped after the gameplay is completed, wherein the video is generated based on the log data after the recording of the log data is stopped.

11. The one or more non-transitory computer-readable recording media of claim 10, wherein the instructions further cause the information processing system to:

store, in a memory, a condition relating to creation of the video, wherein the creating includes creating the video based on the log data and on the condition relating to creation of the video.

12. The one or more non-transitory computer-readable recording media of claim 11, wherein the condition is a condition for extracting, from the log data, log data that satisfies a predetermined condition, and the creating includes creating the video based on the extracted log data.

13. The one or more non-transitory computer-readable recording media of claim 11, wherein the condition is a condition for extracting, from the log data, log data that satisfies a predetermined condition and for replacing processing related to the extracted log data with processing in a different format, and the creating includes creating the video by replacing processing related to the extracted log data with processing in the different format.

14. The one or more non-transitory computer-readable recording media of claim 10, wherein the log data includes character code.

15. An information processing system, comprising:

circuitry configured to:

acquire, from a first terminal device that displays game screens corresponding to a gameplay of a game on a display, log data related to the gameplay of the game during a time period, the log data generated by the first terminal device, the game progressed on the first terminal device based on an input operation from a user;

create, based on the log data, a video that replays the game screen corresponding to gameplay during the time period on the first terminal device;

acquire, from the first terminal device, operation information indicative of the input operation performed on an input interface of the first terminal device hy the user in the game;

generate gameplay information related to the gameplay during the time period on the first terminal device based on the log data;

generate metadata based on the gameplay information and the operation information;

associate the metadata with the video; and output the video and associated metadata for display on a second terminal device, wherein a recording of the log data is started after the gameplay is started, and the recording of the log data is stopped after the gameplay is completed, wherein the video is generated based on the log data after the recording of the log data is stopped.

16. The information processing system of claim 15, wherein
the circuitry is further configured to store, in a memory, a condition relating to creation of the video, and
the circuitry creates the video based on the log data and on the condition relating to creation of the video.

17. The information processing system of claim 16, wherein
the condition is a condition for extracting, from the log data, log data that satisfies a predetermined condition, and
the circuitry creates the video based on the extracted log data.

18. The information processing system of claim 16, wherein
the condition is a condition for extracting, from the log data, log data that satisfies a predetermined condition and for replacing processing related to the extracted log data with processing in a different format, and
the circuitry creates the video by replacing processing related to the extracted log data with processing in the different format.

19. The information processing system of claim 15, wherein the log data includes character code.

20. A system, comprising:
the information processing system of claim 15; and
the first terminal device, wherein
the first terminal device comprises:
second circuitry configured to
execute the game based on user input;
generate the log data related to the gameplay of the game during the time period; and
a communication interface configured to transmit the log data to the information processing system.

21. The system of claim 20, wherein the communication interface transmits the log data to the information processing system each time the second circuitry executes processing related to the gameplay of the game during the time period.

* * * * *